United States Patent [19]

Neefe

[11] Patent Number: 4,865,440
[45] Date of Patent: Sep. 12, 1989

[54] SIMPLIFIED METHOD OF PRODUCING COSMETIC CONTACT LENSES

[75] Inventor: Charles W. Neefe, Big Spring, Tex.

[73] Assignee: Sunsoft Corp., Albuerque, N. Mex.

[21] Appl. No.: 255,859

[22] Filed: Jul. 17, 1989

Related U.S. Application Data

[63] Continuation-in-part of Ser. No. 147,148, Jan. 22, 1988, abandoned, which is a continuation-in-part of Ser. No. 869,583, Jun. 2, 1986, Pat. No. 4,738,520, which is a continuation-in-part of Ser. No. 832,381, Feb. 24, 1986, abandoned.

[51] Int. Cl.$^4$ .......................... B29D 11/00; G02C 7/04
[52] U.S. Cl. ......................................... 351/162; 8/507
[58] Field of Search ............... 351/162, 160 R, 160 H; 8/507

[56] References Cited

U.S. PATENT DOCUMENTS

| 3,476,499 | 11/1969 | Wichterle | 351/162 |
| 3,557,261 | 1/1971 | Wichterle | 351/162 |
| 4,460,523 | 7/1984 | Neefe | 351/162 |

Primary Examiner—Bruce Y. Arnold
Assistant Examiner—Terry S. Callaghan

[57] ABSTRACT

The invention is a method of making a colored cosmetic lens that will change the color of a dark colored eye to a light color. This is achieved by masking the area which are not to be colored, the pupil and periphery beyond the iris. A solution containing a contact lens dye, an expanding or swelling agent and a precipitating agent is prepared. The water soluble precipitating agent is capable of forming an insoluble precipitant when properly reacted. The lens and mask fixture are immersed in the three part solution allowing the solution to swell and enter the surface of the lens iris area. The dye and precipitating agent enter the expanded lens iris area. The lens and mask fixture are transferred from the first three part solution to the second reaction precipitating solution. A colored insoluble precipitant is formed in the lens iris area. The lens is removed from the mask fixture and washed to remove all unreacted materials.

20 Claims, 1 Drawing Sheet

SIMPLIFIED METHOD OF PRODUCING COSMETIC CONTACT LENSES

This is a continuation in part of application serial No. 147,148 filed Jan. 22, 1988 by Charles W. Neefe entitled "DYED EYE COLOR CHANGE CONTACT LENS" now abandoned.

Which is a continuation in part of application No. 869,583 entitled "AN EYE COLOR CHANGE CONTACT LENS" filed 06/02/86 now U.S. Pat. No. 4,738,520 which is a continuation in part of application No. 832,381 entitled "EYE COLOR CHANGE CONTACT LENS BLANK" filed 02/24/86 by Charles W. Neefe now abandoned.

The desire to change and enhance the apparent color of the eye was recorded by the Egyptians five thousand years ago. Cosmetic makeup for the eye area accounts for the larger percentage of the cosmetic sales today.

It is well known that a transparent colored contact lens will not change the color of a dark brown eye.

Several contact lenses have been produced in an effort to achieve cosmetic eye color change of a dark eye.

One attempt employed a laminated structure with a painted opaque plastic member. The result was a thick heavy lens which was difficult to fabricate and difficult to wear. A later attempt employed a colored opaque plastic porous member surrounding a clear cylinder from which the lens was cut by lathing. This resulted in a lens having a pupil and iris pattern and the porous member had tendencies to flake and chip at the edge.

A third generation of colored lenses provided a thin layer of colored opaque markings placed in a clear material. The opaque colored markings radiated from the center of the clear material in a geometric pattern.

PRIOR ART:

Fuhrman 4,558,931 discloses a cosmetic lens blank having horizontal colored layers through which a contact lens is cut from the blank Siegel 3,454,332 discloses a porous opaque colored iris member surrounding a transparent pupil.

Wichterle 3,679,504 discloses a method of painting colored patterns between two hydrogel layers.

Spivack 3,536,386 discloses iris patterns sanwiched between two lens members.

Borowsky 4,576,453 discloses a contact lens having a gradient colored central area.

Negle 3,034,403 discloses a contact lens having an opaque central area.

Kai C. Su 4,553,975 discloses the use of reactive dyes to color transparent contact lenses.

Knapp 4,582,402 discloses a method of coloring contact lenses having an iris pattern formed by intermittent opaque markings.

U.S. Pat. Nos. (Neefe) 4,460,523 and 4,472,327 describe methods of making cosmetic contact lenses wherein the lens segments are joined vertically through the lens.

THE DYED COLOR CHANGE CONTACT LENS FUNCTIONS AS FOLLOWS:

A soft hydrophilic contact lens made by lathing, molding or spin casting and is dyed the desired opaque color in the iris area. In order to provide this color change qualities, barium sulfate is precipitated within the lens matrix making the colored lens iris area opaque. When the lens is placed on the eye the opaque light reflecting colored iris area will change the apparent color of the eye. The central pupil area and the peripheral lens area are transparent. The peripheral area is clear and colorless; the pupil area is transparent and may be clear or colored.

SUMMARY OF THE INVENTION

The invention comprises a corneal contact lens having a transparent pupil section, and a colored iris section surrounding the pupil section, and a opaque or semi-opaque light reflecting pattern deposited over the iris section, thereby providing a lens capable of changing the apparent color of the iris. The colored pattern should be undiscernable to the ordinary viewer at a distance of two feet or greater.

Figure 1:
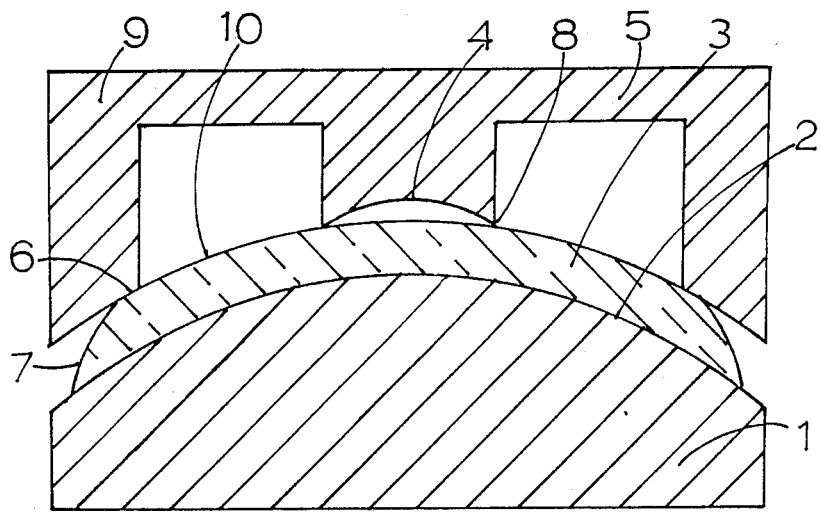
FIG. 1 shows the lens support in section convex lens surface up.
Figure 2:
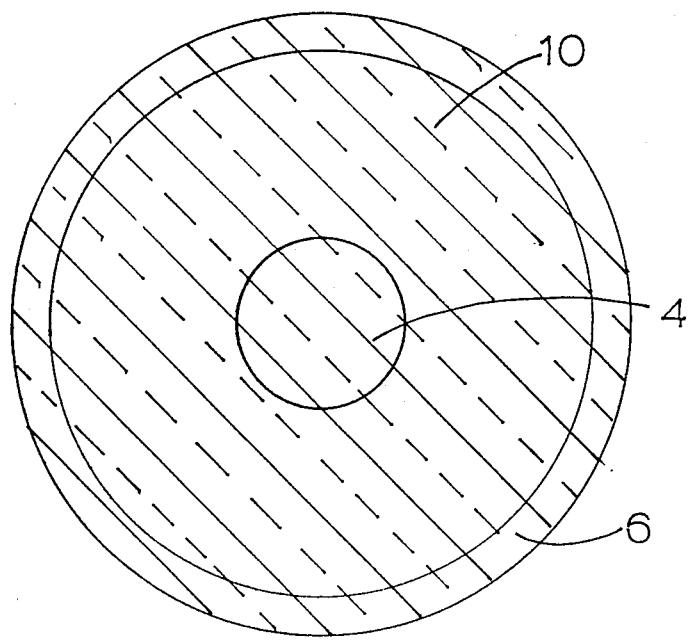
FIG. 2 shows the finished cosmetic lens from the front.

THE COSMETIC LENS IS MADE AS FOLLOWS:

The lens 3 as shown in FIG. 1 is placed on the convex surface 2 of the lens support 1. The dye mask 9 is fitted over the convex surface 10. The pupil mask 8 has a concave radius 4 which is shorter than convex lens radius. The peripheral zone mask 6 provides the clear peripheral lens zone. The assembled dye device is placed in the combination precipitating, swelling and dye solution. The dye solution is allowed to penetrate and combine with the lens material in the convex iris area 10 as shown in FIGS. 1 and 2 which is not protected by the mask segments 6 and 4. The convex lens surface 10 is exposed to the swelling agent in the dye and absorbs the color and precipitating solution into the convex lens surface 10. The pupil area 4 and the peripheral area 6 remain clear.

EXAMPLE OF USABLE DYES:

The color additives are formed by reacting one or more reactive dyes with poly (hydroxyethl methacrylate), so that the sulfate group of the dye is replaced by an ether linkage to the poly (hydroxyethyl methacrylate).

(1) Reactive Black 5 [2,7-naptha-lenedisulfonic acid, 4-amino-5-hydroxy-3,6-bis((4-((2-(sulfooxy)ethyl)sulfonyl)phenyl) azo)-tetradodium salt] (CAS Reg. No. 17095-24-8);

(2) Reactive Blue 21 [copper, (29H,31H-phtalocyaninato(2-)-$N^{29},N^{30},N^{31},N^{32}$)-, sulfo((4-((2-sulfooxy)ethyl)sulfonyl)phenyl) amino)sulfonyl derivs] (CAS Reg. No. 73049-92-0);

(3) Reactive Orange 78 [2-napththa-lenesulfonic acid, 7-(acetylamino)-4-hydroxy-3((4-((2-(sulfooxy)ethyl)sulfonyl) phenyl)azo)-] (CAS Reg. No. 68189-39-9);

(4) Reactive Yellow 15 [benzensulfonic acid, 4-(4,5-dihydro-4-((2-methoxy-5-methyl-4-((2-(sulfooxy)ethyl)-sulfonyl) phenyl)azo)-3-methyl-5-oxo-1H-pyrazol-1-yl)-] (CAS Reg. No. 60958-41-0); and (5) Reactive Blue No. 19 [2-anthracene-sulfonic acid, 1-amino-9,10-dihydro-9,10-dioxo-4-((3-((2-(sulfooxy)ethyl)sulfonyl) phenyl)amino)-,disodium salt] (CAS Reg. No. 2580-78-1).

As part of the manufacturing process, the lenses containing the color additives are thoroughly washed to remove unbound reactive dyes.

These are examples only as other dyes can be used with equal results.

Some examples of these dyes, taken from the Color Index, Volume 5, Third Edition include;

| Commercial Name | | C. I. Generic Name |
| --- | --- | --- |
| Brilliant Blue B | HOE | C. l. Reactive Blue 27 |
| Brilliant Violet 4R | HOE | C. l. Reactive Violet 27 |
| Turquoise FC3A | HST | C. l. Reactive Blue 91 |
| Brilliant Green 3GL | FBy | C. l. Reactive Green 9 |
| Brilliant Green 1B | FBy | C. l. Reactive Green 2 |
| Brown 5RL | BAY | C. l. Reactive Brown 4 |
| Dark Brown,P-BRA | BAY | C. l. Reactive Brown 24 |
| Red Violet E-2BL | BAY | C. l. Reactive Violet 7 |
| Orange G | CFM | C. l. Reactive Orange 32 |
| Red B | CGY | C. l. Reactive Red 65 |
| Violet 3B | CGY | C. l. Reactive Violet 34 |
| Yellow 6G | CGY | C. l. Reactive Yellow 126 |

In general, the formation of a covalent bond between the lens material and the reactive dyestuff is effected by contacting of the dyestuff formulation with the lens material until reaction is complete.

Some of the opaque compounds which may be used to practice the invention are Zink Oxide, Tin Oxide, Titanium Dioxide and Barium Sulphate.

In order to place the light reflecting dye layer deeper in the lens, a swelling agent is added to the solution to be precipitated. Swelling agents cause the pores of the hydrogel lens to become engorged allowing the precipitating dye solution to penetrate deeper into the lens structure.

Examples of useful super swelling agents are:
Ethyl Alcohol
Urea
Butanol
Methanol
Methyl Sulfoxide
Dimethyl Formamide The swelling agents are used in the precipitating dye solution in amounts ranging from 0.5% to 50% by weight.

The lenses are stored in the gel state in a normal saline solution (0.9% sodium chloride). The super swelling agents cause the lens surface to swell greatly enlarging the surface pores thus allowing the precipitating dye solution to move into the lens.

EXAMPLES:

(1) A combination swelling dye and precipitating solution is prepared which swells the lens structure thus increasing the water content and pore size. Swelling allows the dye and precipitating agents to penetrate deep into the lens material. The combination solution contains a dye selected from those previously listed a swelling agent selected from the swelling agent also listed and a precipitating agent such as barium chloride. A typical formula is as follows:
Dye, Reactive Blue 21, = 0.2g
Swelling agent, Urea, = 2.0g
Precipitating Agent, Barium chloride, = 3.5g
Water = 100 ml (2) The swelling agent and the opaque precipitating dye solution is applied to the iris area of the concave or convex lens surface. In this example the dye will adhere to the surface of the precipitated particles providing a colored opaque precipitant.

(3) The lens is placed in a dye mask and immersed in the combination dye, swelling and precipitating solution for from 5 to 50 minutes. Longer times provide darker color and stronger eye color change. The lens in the dye mask are removed and placed in dilute sulfuric acid solution. 0.1 ml concentrated sulfuric acid to 100 ml water. In two to ten minutes the barium chloride is reacted to insoluble barium sulfate and the lens is removed from the dye mask and washed.

(4) The localized swelling provided by the swelling agents results in a distortion of the lens surface contour in the area being expanded. The localized distortions radiate from the pupil and effect the dye absorption. This distortion results in formation of an iris pattern due to uneven absorption of the precipitating dye solution in the distorted iris area.

An additional advantage of the inventive lenses is the fact that many of the dyestuffs and other additives used for tinting the lens tend to absorb ultraviolet, visible and infared radiation, particularly of the wave-lengths shown to harmful to the eye.

It is understood that the invention is not limited to the exact details of construction shown and described herein for obvious modifications will occur to persons skilled in the art.

I claim:

1. A method of making a colored soft cosmetic contact lens that changes the apparent color of the eye upon which it is placed by the steps of, providing a hydrated soft colorless contact lens, providing a fixture that masks the lens pupil area and the peripheral lens area outside the lens iris area, preparing a three part solution containing;
   (1) a contact lens dye of the desired color,
   (2) a super swelling agent which increases the water content of the hydrated lens material,
   (3) a water soluble precipitating agent that may be reacted to form an insoluble opaque precipitant,
immersing the hydrated lens and mask fixture in the three part dye solution, allowing the super swelling agent to swell and increase the water content of the lens iris area, allowing the dye and precipitating agent to penetrate into the lens material, removing the lens and dye mask fixture from the three part solution, immersing the lens and dye mask fixture in a precipitating reaction solution to form an insoluble precipitant in the iris area of the lens, removing the lens from the dye mask fixture, washing the colored cosmetic lens to remove excess solutions.

2. A method as in claim 1 wherein the swelling agent is urea.

3. A method as in claim 1 wherein the color and precipitant are on the convex lens surface.

4. A method as in claim 1 wherein the color and precipitant are on the concave lens surface.

5. A method as in claim 1 wherein the precipitant is barium sulfate.

6. A method as in claim 1 wherein the soft contact lens is made by spin casting.

7. A method as in claim 1 wherein the lens is made by lathe cutting.

8. A method as in claim 1 wherein the lens is made by molding.

9. A method of making a colored soft cosmetic contact lens that changes the apparent color of the eye upon which it is placed by the steps of, providing a soft hydrated contact lens, providing a fixture that masks the lens pupil area and the peripheral lens area outside the lens iris area, preparing a three part dye swelling and precipitating solution containing;

(1) a contact lens dye of the desired color,
(2) a swelling agent which increases the water content of the hydrated lens material,
(3) a water soluble precipitating agent that may be reacted to form an insoluble opaque precipitant, immersing the lens and mask fixture in the three part dye solution, allowing the swelling agent to swell and increase the water content of the lens iris area, allowing the dye and precipitating agent to penetrate into the iris area of the lens material, removing the lens and dye mask fixture from the three part solution, immersing the lens and dye mask fixture in a precipitating reaction solution, allowing the reaction solution to react with the precipitating solution to form an insoluble precipitant in the iris area of the lens, removing the dyed lens from the dye mask fixture, washing the colored cosmetic lens to remove excess solutions, placing the colored cosmetic lens on the eye.

10. A method as in claim 9 wherein the swelling agent is urea.

11. A method as in claim 9 wherein the color and precipitant are on the convex lens surface.

12. A method as in claim 9 wherein the color and precipitant are on the concave lens surface.

13. A method as in claim 9 wherein the precipitant is barium sulfate.

14. A method as in claim 9 wherein the soft contact lens is made by spin casting.

15. A method of making a colored cosmetic contact lens by the steps of, providing a soft hydrated contact lens, providing a fixture that masks the lens pupil and peripheral area, preparing a three part solution containing;

(1) a contact lens dye,
(2) a swelling agent,
(3) a water soluble precipitating agent, immersing the lens and mask fixture in the three part dye solution, allowing the dye and precipitating agent to penetrate the lens material, removing the lens and dye mask fixture from the three part solution, immersing the lens and dye mask fixture in a reaction solution to form an insoluble precipitant in the iris area, removing the lens from the dye mask fixture, washing the colored lens to remove excess solutions.

16. A method as in claim 15 wherein the swelling agent is urea.

17. A method as in claim 15 wherein the color and precipitant are on the convex lens surface.

18. A method as in claim 15 wherein the color and precipitant are on the concave lens surface.

19. A method as in claim 15 wherein the precipitant is barium sulfate.

20. A method as in claim 15 wherein the soft contact lens is made by spin casting.

* * * * *